(12) United States Patent
Webb et al.

(10) Patent No.: US 6,567,128 B1
(45) Date of Patent: May 20, 2003

(54) VIDEO SIGNAL PROCESSING IN WHICH FIRST VIDEO INFORMATION AND ADDITIONAL VIDEO INFORMATION ARE COMBINED TO PRODUCE FRAMES THAT ARE ENCODED WITH DIFFERENT PICTURE QUALITIES FOR EDGE AND NON-EDGE REGIONS

(75) Inventors: Robert Webb, Basingstoke (GB); Nicholas Ian Saunders, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 325 days.

(21) Appl. No.: 09/653,036

(22) Filed: Sep. 1, 2000

(30) Foreign Application Priority Data

Sep. 3, 1999 (GB) .............................................. 9920929

(51) Int. Cl.[7] .............................................. H04N 9/74
(52) U.S. Cl. .................................. 348/584; 375/240.26
(58) Field of Search ................................ 348/584, 564, 348/600, 589; 382/235; 375/240.08, 240.26

(56) References Cited

U.S. PATENT DOCUMENTS

| | | | |
|---|---|---|---|
| 5,126,832 A | | 6/1992 | Lee et al. |
| 5,594,507 A | | 1/1997 | Hoarty |
| 6,122,014 A | * | 9/2000 | Panusopone et al. ....... 348/592 |
| 6,141,442 A | * | 10/2000 | Chen .......................... 382/166 |
| 6,208,693 B1 | * | 3/2001 | Chen et al. ............. 375/240.24 |
| 6,373,530 B1 | * | 4/2002 | Birks et al. .................. 348/584 |
| 6,462,744 B1 | * | 10/2002 | Mochida et al. ............ 345/543 |

FOREIGN PATENT DOCUMENTS

| | | |
|---|---|---|
| EP | 0 577 350 A2 | 1/1994 |
| EP | 0 656 729 A2 | 6/1995 |
| EP | 0 923 231 A1 | 6/1995 |
| GB | 2259218 | 3/1993 |
| WO | WO 99 51033 | 10/1999 |

OTHER PUBLICATIONS

Smith B C et al: "Algorithms for Manipulating Compressed Images" IEEE Computer Graphics and Applications,US, IEEE Inc. New York, vol. 13, No. 5, Sep. 1, 1993, pp. 34–42, XP000562744 ISSN: 0272–1716.

* cited by examiner

*Primary Examiner*—Victor R. Kostak
(74) *Attorney, Agent, or Firm*—Frommer Lawrence & Haug LLP; William S. Frommer (57) ABSTRACT

A video signal processor comprises a first input for receiving a compressed first video signal including parameters associated with the frames of the signal and relating to the compression. A decoder decodes the compressed first video signal while preserving the parameters in association with the frames. A second input receives additional video information to be combined with the first video information. A combiner superimposes the additional video information on the first video information. An encoder encodes the combined video information. The encoder reuses the preserved parameters for encoding at least parts of the combined information which are not derived from the superimposed video information.

23 Claims, 7 Drawing Sheets

MB(n) IS NON-LOGO

FIG. 12A

XXXX = BEST MATCH

FIG. 12B

MB(n) IS NON-LOGO

FIG. 13A

XXXX = BEST MATCH

VIDEO SIGNAL PROCESSING IN WHICH FIRST VIDEO INFORMATION AND ADDITIONAL VIDEO INFORMATION ARE COMBINED TO PRODUCE FRAMES THAT ARE ENCODED WITH DIFFERENT PICTURE QUALITIES FOR EDGE AND NON-EDGE REGIONS

BACKGROUND OF THE INVENTION

1. Field of the Invention

This invention relates to video signal processing, for example, processing in which compressed data representing two or more video signals are combined. Embodiments of the invention concern video signals compressed according to the known MPEG-2 standard, but the invention is not limited to such signals.

2. Description of the Prior Art

It is often desirable to mix, wipe or superimpose two or more video signals. For example, a so-called wipe effect might be used to transition between two different scenes in a television programme, or a so-called logo or other computer-generated signal such as a subtitle or a set of credits might need to be superimposed over a video image without otherwise disrupting the underlying image.

With analogue video signals, or even with uncompressed digital video signals, this operation is relatively straightforward. A key signal can be used to control the level of each of the constituent video signals (say, signals "A" and "B") at each pixel position, with the two level-controlled signals then being added together. A basic relationship between the level of the key K signal, the levels A and B of the input pixels and the level of out output pixel at each pixel position might be:

$$\text{Output pixel value} = A(1-K) + BK$$

This process is carried out for each output pixel. So, if signal A is to be replaced in its entirety by signal B at a particular pixel position, the key signal would be 1 (otherwise expressed as 100%), and if there is to be a 50:50 mix of the two pixels the key value would be 0.5 or 50%.

The situation is much more difficult when either or both inputs is a compressed video stream. In a compressed video stream such as an MPEG-2 video stream, pixels are generally compressed as blocks known as macroblocks, so that it is not possible to derive the value of a particular pixel directly from the compressed video signal.

Compressed video signals are also often subject to an overall limit on the quantity of data that can be used to transmit or store the signal. While there can be some variation from picture to picture, or even from group-of-pictures (GOP) to (GOP), the time-averaged data rate is often constrained to the capacity of a transmission or storage channel. This allowable variation from picture to picture or GOP to GOP can mean that two signals to be combined can have the same nominal data rate but very different instantaneous data rates. So, when constructing a composite video signal from a group of video signals including one or more compressed signals, great care is needed to avoid a data overflow or underflow.

A third feature of compressed video signals relevant to this discussion is that they often make use of motion vectors to indicate blocks of temporally preceding or following pictures which are similar to a block of a current picture and so can cut down the amount of data needed to encode the current picture.

One way of handling these problems is to decompress the entire compressed input signals, carry out the mixing or similar process in the non-compressed domain and then recompress the resulting composite picture.

In systems such as the MPEG-2 system each generation of compression tends to reduce the quality of the resulting images. It is undesirable if the simple addition of logo or similar information causes a deterioration in the overall image quality of the pictures to which the logo information is added.

SUMMARY OF THE INVENTION

According to one aspect of the present invention, there is provided a video signal processor comprising a first input for receiving a compressed first video signal including parameters associated with the frames of the signal and relating to the compression, a decoder for decoding the compressed first video signal whilst preserving the compression parameters in association with the frames, a second input for receiving additional video information to be combined with the said first video information, a combiner for combining the additional video information with the first video information to produce frames of combined information, and an encoder for encoding the frames of combined video information, reusing the said preserved parameters of each frame for encoding a part of a frame of the combined information which does not contain additional video information and for encoding an edge region of another part of the frame, which another part contains additional information, to a higher picture quality than a region of said another part which is not the edge region.

Reusing the preserved compression parameters for the part or parts of the combined information which do not contain additional information (logo information) results in a smaller overall loss of image quality than from fully re-coding the whole frame of combined video information.

It has been found that edge regions of the logo information tend to be significant in terms of subjective picture quality. Encoding the edges with a higher quality than elsewhere within the logo improves the subjective picture quality.

In a preferred embodiment, the said edge region is encoded to a higher picture quality than the non-edge region of the logo information only if the first signal has a higher picture quality than the said non-edge region.

In a preferred embodiment, the encoder encodes the edge region with a predetermined value of the quantization parameter Q. In the embodiment, the edge region may be defined by a value of the key signal less than a threshold value.

In a preferred embodiment of the invention, quantisation parameters determined according to a predetermined algorithm are applied only to non-edge regions of the part of the frame containing logo information. This allows the quantisation of the logo to be determined separately from that of the picture regions containing only the first information. Thus the logo can be quantised to any desired quality. That quality could in principle be more or less than that of the first information. However it is currently envisaged that users will tend to choose lower quality for the additional information to preserve the quality of the first information.

In one embodiment, the quantisation for the additional information is chosen by the user and is for example a fixed value. The user chooses a value which provides the user with a desired quality of the additional information. An example of such additional information is a station identification logo or "ident" which is superimposed on main picture information and which may not require the same quality as the main picture information.

In another embodiment, where the region contains both first and additional information, then that region is quantised according to a weighted average of the fixed value of quantisation of the additional information and the preserved value of quantisation of the first information in the region.

The said regions are macroblocks as used in MPEG2 bitstreams for example.

In preferred embodiments of the invention, the processor includes a key signal generator for producing a key signal K defining the said regions of the picture containing the additional information. In one such embodiment, the said quantisation parameter $Q_w$ is determined according to a predetermined algorithm $$Q_W = K_A Q_F + (1-K_A) Q_B$$

where $K_A$ is the average key value for a macroblock, $Q_F$ is a predetermined fixed value of Q and $Q_B$ is the preserved value of the quantisation parameter of the first video signal.

According to another aspect of the invention there is provided a method of processing a video signal processor comprising the steps of:

receiving a compressed first video signal including parameters associated with the frames of the signal and relating to the compression, decoding the compressed first video signal whilst preserving the compression parameters in association with the frames, receiving additional video information to be combined with the said first video information, combining the additional video information with the first video information to produce frames of combined information, and encoding the frames of combined video information, reusing the said preserved parameters of each frame for encoding a part of a frame of the combined information which does not contain additional video information and for encoding an edge region of another part of the frame, which another part contains additional information, to a higher picture quality than a region of said another part which is not the edge region.

According to a further aspect of the present invention, there is provided a computer program product providing computer executable instructions, which when loaded on to a programmable signal processor causes the processor to implement the method of said another aspect of the invention.

According to a yet further aspect of the present invention, there is provided computer program product providing computer executable instructions, which when loaded on to a programmable signal processor causes the processor to operate as the processor of said one aspect of the invention.

BRIEF DESCRIPTION OF THE DRAWINGS

Illustrative embodiments of the invention will now be described with reference to the accompanying drawings in which.

DESCRIPTION OF THE PREFERRED EMBODIMENTS

Overview

FIGS. 1 to 4 illustrate in schematic form some video processing operations which can be carried out to combine one video signal (A) with another video signal (B).

Figure 1:
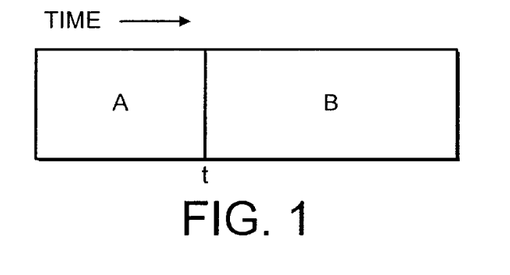
FIG. 1 schematically illustrates a video splice operation.
Figure 2:
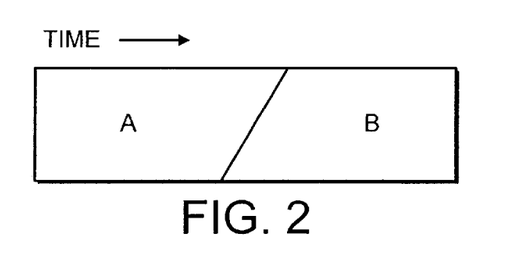
FIG. 2 schematically illustrates a video dissolve operation.

FIGS. 1 and 2 are schematic "timeline" representations for a splice operation and a dissolve operation respectively. In FIG. 1, an abrupt change is made from signal A to signal B at a particular time t. In FIG. 2, a gradual change is made so that signal A is mixed into signal B over a particular time period.

Figure 3:
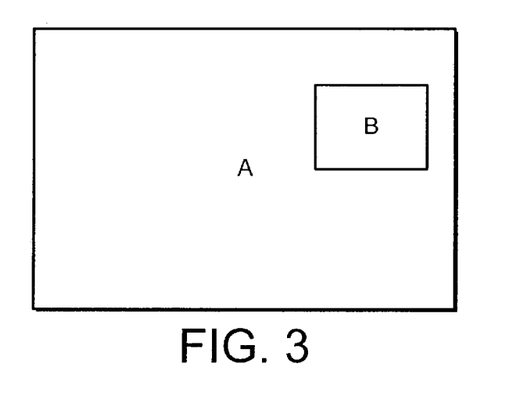
FIG. 3 schematically illustrates a video logo insertion operation.
Figure 4:
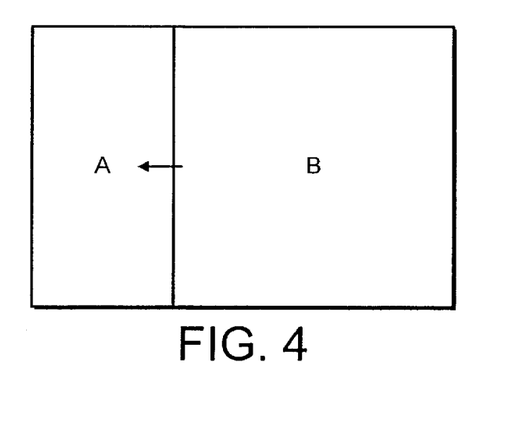
FIG. 4 schematically illustrates a video wipe operation.

FIGS. 3 and 4 schematically illustrate television pictures themselves. FIG. 3 illustrates a "logo" insertion, where a sub-portion of picture A is replaced by or mixed with picture B, and FIG. 4 illustrates a wipe operation where the two pictures occupy complimentary portions of the screen and the boundary between the two is movable.

The present description is concerned with the types of video processing operations which need to be carried out in connection with the types of video processing operations shown in FIGS. 2, 3 and 4. In other words, these are operations where parts of both pictures A and B are present on the screen at the same time. The matter of FIG. 1, which is the splicing of one video signal to another, is not dealt with in the present application.

FIGS. 5 to 7 show, again in schematic form, the superposition of a logo onto a video picture, that is to say a more detailed version of FIG. 3.

Figure 5:
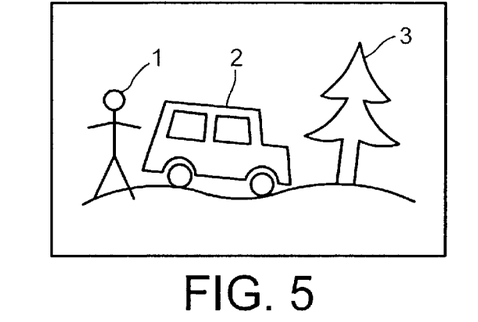
FIGS. 5 and 6 schematically illustrates a video logo insertion operation in greater detail.
Figure 6:
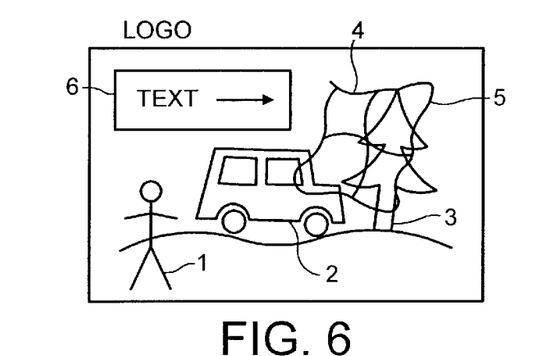

In FIG. 5, a video picture shows an original scene which may typically include moving objects 1, 2 and static objects 3. In FIG. 6, additional video information including a textual logo 6 and further information such as a geographical map 5 is superposed over the original image. An example of circumstances in which this might be desired is to broadcast a warning of an impending occurrence such as a weather-related warning for a particular region, while not disturbing the underlying program too much.

Figure 7:
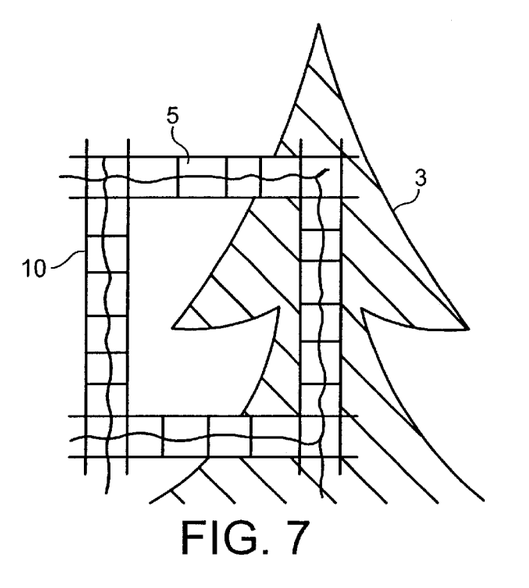
FIG. 7 is a schematic close-up view of part of FIG. 6 showing an overlap between an inserted logo and background video.

FIG. 7 is a schematic close-up view of part of FIG. 6 showing the overlap between the static map 5 and parts of the original image 3. In a block-based system such as MPEG 2 where each image is divided into so-called macroblocks, it can be seen that a number of macroblocks are affected by the overlap of the images. The macroblocks are illustrated as square blocks 10 in FIG. 7.

The remainder of the present description will deal with a video signal processor capable of handling the presence of video information from two sources A and B present on the screen at one time. A block diagram of the apparatus will be described first with reference to FIG. 8, followed by the flowchart of FIG. 9 defining its mode of operation. Particular features of the operation will then be described with reference to further respective Figures.

Accordingly, reference will now be made to FIG. 8 which is a schematic diagram of a video signal processor.

An encoder E1 receives an input video signal A and encodes it according to a desired output target bit rate TBR and GOP format. In situations where no mixing between the two video signals is required, the video signal encoded by the encoder E1 can be supplied directly for output via a switch S1 under the control of a controller 100. The encoder E1 is written in parentheses to illustrate the fact that if the input video signal is already in the required format, the encoder E1 may of course not be required.

The output of the encoder E1 is supplied to a complementary decoder D1 which decodes the video back to an uncompressed or "baseband" form. The baseband video signal is supplied to a mixer 110 and compression parameters used in the original compression in each block of the input video signal A are supplied to the controller 100.

A source 120 of a video signal to be mixed, video B, supplies video signal B to another encoder E3. Again, E3 is shown in parentheses to illustrate the fact that it may not be required if the video signal B is already in a required format. The output of encoder E3 is a video signal at a corresponding bit rate and GOP format to that of the output of encoder E1, and is supplied to a further decoder D3 which derives compression parameters from the video signal and decodes video B back to baseband form for supply to the mixer 110.

If desired, either one of the encoder-decoder pairs E1/D1 or E3/D3 may be omitted and uncompressed or "baseband" video is provided directly at one of the inputs of the mixer 110 to be added to decoded compressed video at the other of the inputs.

The source 120 also supplies a key signal K to the mixer 110 (although the key signal could of course come from a different external source). The key signal defines the relative proportions of video A and video B to be used for each pixel of the required output image, and so the key signal K may vary between 0 (all video A to be used) and 1 (all video B to be used). This variation takes place on a pixel-by-pixel basis, with K values between 0 and 1 indicating a mix between the two signals at that position.

Accordingly, the mixer 110 operates in a generally conventional manner, and on a pixel-by-pixel basis, to multiply pixels of video B by K at a multiplier 112, to multiply pixels of video A by (1−K) at a multiplier 114, and then to add the two products together at an adder 116 to generate pixels of an output mixed video signal. The mixed video signal is supplied to a further encoder E2, again operating to the same nominal bit rate and GOP format as E1 and E3, which serves to encode the mixed video signal for output via switch S1.

The controller 100 controls the operation of the encoder E2. In fundamental terms, the controller 100 controls whether the encoder E2 re-uses some or all of the compression parameters associated with the compression of blocks of the video signals A and B before they were mixed, or generates new compression parameters for encoding the blocks of the mixed video signal C.

As part of its operation, which will be described in much greater detail below, the controller 100 receives details of the compression parameters of video signal A, details of the compression parameters of video signal B and a specification of a target output data rate (TBR). The controller 100 also accesses memory stores 130 in which various pieces of information including some derived from the key signal K may be retained.

Figure 8:
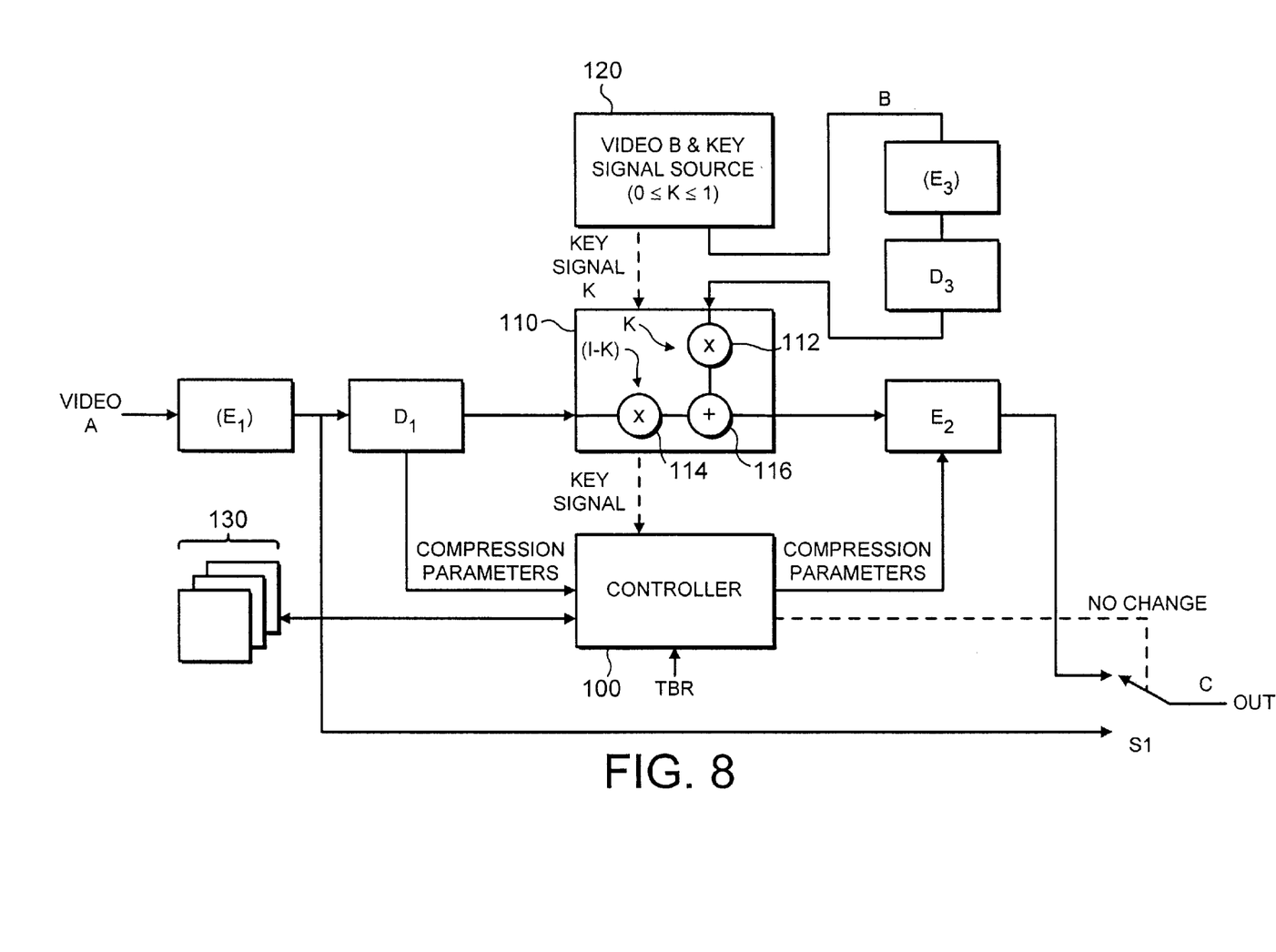
FIG. 8 is a schematic diagram of a video signal processor ion accordance with aspects of the present invention.
Figure 9:
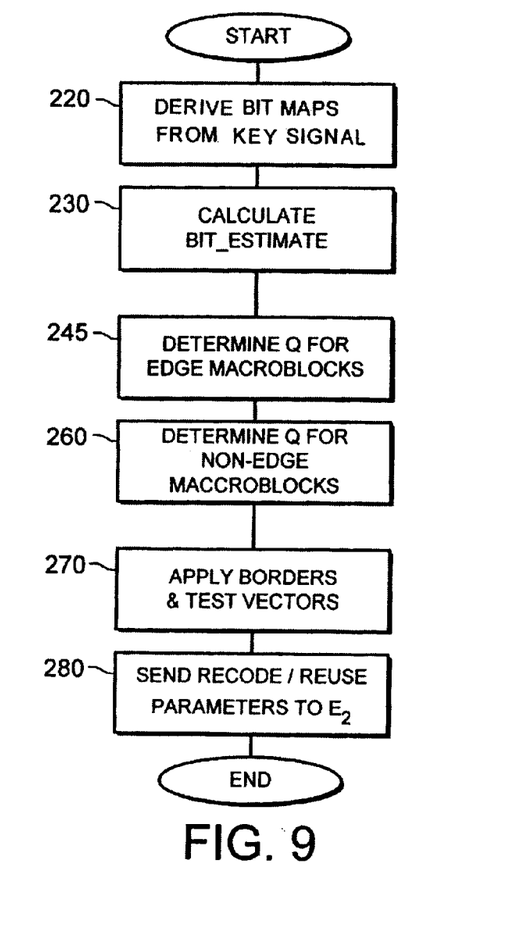
FIG. 9 is a schematic flow chart illustrating the operation of the processor of FIG. 8.

FIG. 9 is a flowchart schematically illustrating the operation of the processor of FIG. 8.

At a step 220, "Bit Maps" are derived from the key signal K indicating the positions in the compressed frames of the logo. This will be described in more detail below with reference to FIGS. 12A and B; 13A and B; and 14A to D.

At a step 230 the controller 100 establishes an estimate of the total number of bits required to encode the current frame of the mixed video signal. To do this, it does not actually apply a rate control algorithm to the mixed video signal, but instead calculates the estimate at least in part from historical data relating to the number of bits required to encode each macroblock of the two individual source video signals A and B. This process will be described in detail below.

At the next step 245, the quantisation parameters (and other transcoding parameters) of logo macroblocks at the edge of the logo are determined as will be described in more detail below.

At a step 260 the quantisation parameters (and other transcoding parameters) of logo macroblocks which are not edge macroblocks are determined as will be described in more detail below.

Step 260 may be applied to all logo macroblocks if, as in one embodiment of the invention, step 245 is omitted.

At the step 270, a test is carried out to determine whether the motion vectors associated with the macroblocks of the mixed signal C point to valid areas of reference images. For example, a macroblock may be wholly inside video A, but its associated motion vector may point to a region replaced by video B in the reference frame. In these circumstances it would be inappropriate to use that motion vector. This process is described in detail below with the reference to FIGS. 12, 13 and 14.

Once this test is complete, the full set of re-code or re-use parameter information is sent at step 280 by the controller 100 to the encoder E2 which encodes the mixed video signal C in accordance with this information. In cases where mixing takes place between video A and video B, the controller 100 operates the switch S1 to select the output of encoder E2 for the entire frame.

The encoder E2 includes a rate control algorithm. This may be, for example, a predictive rate control algorithms such as the so-called "test model 5" of the MPEG system, or maybe a pre-encode or rehearsal type rate control algorithm such as that described in GB-A-2 306 831. In any event, the parameters applied by the controller 100 to the rate control algorithm are identical to the original compression parameters received from the decoders D1 and D3 in the case of macroblocks where it has been determined that the parameters should be re-used, and, in the case of macroblocks where it has been determined that the parameters should not be re-used, comprise an indicator flag indicating to the rate control algorithm that new parameters should be derived.

A special case here is the particular situation of an inserted logo, where in order to maintain the picture quality of the logo itself it may be desirable to specify a limit for the quantisation parameter for use on blocks containing logo material in order to set a maximum degree of harshness of the quantisation process. Again, that condition can be signaled from the controller 100 to the rate control algorithm in respect of macroblocks determined to contain primarily or all video B material. (This of course depends on a subjective decision as to whether the inserted video signal comprises a logo or other material, and this is naturally a decision made by the operator or user).

The rate control algorithm of the encoder E2 generates compression parameters for those macroblocks to be re-encoded and then the encoder E2 encodes the whole frame on the basis of the received or derived parameters.

In the following description, it is assumed by way of example that logo information (such as textual logo and maps) represented in e.g. FIG. 3 by video B is superposed over video A. It is also assumed that encoder E3 and decoder D3 of FIG. 8 are both omitted.

Bit Map

As described above, a key signal K is generated pixel-by-pixel in known manner. The key signal is used as described above to superimpose the logo information onto the original scene. A bit map is generated from the key signal by the controller 100.

The bit map may have pixel resolution to indicate, pixel-by-pixel, the pixel positions containing logo information.

Alternatively the bit map may have macroblock resolution to indicate the macroblocks containing logo information.

Thus the bit map indicates the pixels or macroblocks MB which contain logo information (logo areas) and these which do not (non-logo areas).

Transcoding Parameters

The examples of the invention discussed in the following discussion refer to the following transcoding parameters (amongst others which are used in MPEG 2);

1) Q which is the parameter defining the quantisation scales applied to a frame;
2) DCT_type, which is the parameter defining the type (field or frame) of DCT processing; and
3) Motion Vectors.

The first video bitstream A has I, P and B frames. These are decoded in decoder D, and recoded in encoder E2. The encoder E2 is controlled by controller 100 so that an I frame of the first bitstream A is recoded in stream C as I, a P frame is recoded as P, and a B frame is recoded as B.

The parameters Q and DCT-type are applied to the recoding of the combined original information and logo according to a first technique or, alternatively, according to a second technique.

A. Detecting Logo Macroblocks

Figure 10:
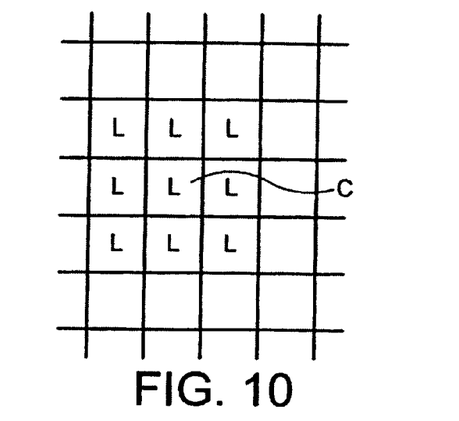
FIG. 10 is a schematic illustration of a bit map of a logo area.

A schematic illustration of a bit map is shown in FIG. 10. FIG. 10 shows an array of macroblocks. Macroblocks designated L contain logo information. Those macroblocks are surrounded by other macroblocks which do not contain logo information. It will be appreciated that FIG. 10 is highly simplified for ease of explanation. The key signal produced by the key signal generator 120 of FIG. 8 defines pixel by pixel the places in a frame which contain logo information. A bit map 18 is produced from the key signal. Bit maps are described in more detail below.

A1. Solid Macroblock

In one version of the present invention, the presence of a logo in a macroblock is tested by determining whether ALL pixels of the part of the bit map corresponding to the macroblock contain logo information. If so, the macroblock is determined to contain a "solid" logo and is referred to herein as a "solid Macroblock". This one version operates at pixel resolution.

A2. Central Macroblock

In another version, referring to FIG. 10 a macroblock is determined as containing logo information if that macroblock (C in FIG. 10) and its eight neighbouring macroblocks all contain logo information. This other version operates at macroblock resolution and thus requires less processing than, but is less accurate than, the one version. In fact the macroblock C may contain first video information: the test determines whether it and its neighbours all contain logo information. Thus this type of macroblock is referred to herein as a "Central Macroblock".

A3. Encoding Solid and Central Macroblocks a) The Q and DCT-type parameters preserved from the I-frames of the original, first, video bitstream are applied unchanged to the macroblocks of I-frames of the combined video information, which are not solid or central macroblocks.

As a consequence, any macroblock which is not solid or not central may be encoded with the preserved parameters even if it contains some logo information.

b)

b1) preferably, in P frames, macroblocks which are not solid or central are recoded reusing the transcoding parameters preserved from the first video bitstream, and all macroblocks of B frames are fully recoded.

b2) Alternatively, all macroblocks of P and B frames of the combined video information are fully recoded.

c) The DCT_type is reused on all macroblocks of all frames.

d) In accordance with one example of the present invention, in I frames (and preferably also in P frames), for solid and central macroblocks Q is a fixed predetermined value chosen by the user. The chosen value is fixed when the system is initially set up for example. It may be varied if the user wishes to choose a new value for it.

This technique is preferably used for logos which are fixed in position in a frame such as a station identification or "ident". The user chooses a value of Q which produces a logo having the picture quality the user wants. The lower the value of Q, the greater the number of bits used to encode the logo and hence the greater the image quality.

The I-frames of the combined information include more data than the first video bitstream. The rate control of the encoder E2 encodes according to the Q values of the first video bitstream outside the logo macroblocks L. Rate control allocates the bits to the I, P and B frames to meet the target bit rate.

B "Transparent" Macroblocks

This technique is an alternative to the "solid" or "central" technique described above. A macroblock of a logo may be termed "transparent". That is a logo region of a frame may contain the first video information (B) and logo (A), mixed according to $A*K+(1-K)*B$, where K is the magnitude of the keying signal. If K=0 the logo is absent. If K=1 the logo is solid. If 0<K<1 the logo is transparent.

The key signal K represents the degree of mixing of A and B pixel by pixel. To detect whether a macroblock is transparent, the value of K is averaged over the macroblock. If the average is $K_A=0$ then only the first video is present. If the average is 1 the macroblock is solid. If the average is between 0 and 1 the macroblock is transparent.

Encoding Transparent Macroblocks

For macroblocks containing no logo information, the Q and DCT-type parameters preserved from the I-frames of the original, first, video bitstream are applied unchanged to those macroblocks.

b)

b1) preferably, in P frames, macroblocks which contain no logo information are recoded reusing the transcoding parameters preserved from the first video bitstream, and all macroblocks of B frames are fully recoded.

b2) Alternatively, all macroblocks of P and B frames of the combined video information are fully recoded.

c) The DCT_type is reused on all macroblocks of all frames.

Determining Q

For step d), in I frames (and preferably also in P frames), the value of Q for a macroblock containing logo information is determined as a weighted average $Q_W$ $$Q_W = K_A Q_F + (1-K_A) Q_B$$

where $K_A$ is the average key value for the macroblock, $Q_F$ is a fixed value of Q as chosen as in the technique "1. Solid Macroblocks" described above and $Q_B$ is the preserved value of the Q of the first video information. Thus if the macroblock is "solid" $K_A=1$ and the fixed value $Q_F$ is applied to the macroblock. If the macroblock is transparent then the mixed values of $Q_F$ and $Q_B$ are applied.

Preferably, the weighted average $Q_W$ is used if $Q_B \leq Q_F$ that is if the background video has a greater picture quality than the fixed quality of the logo.

Most preferably, if $Q_B > Q_F$, the fixed value $Q_F$ is used in the macroblock.

Logo Edges

Figure 11:
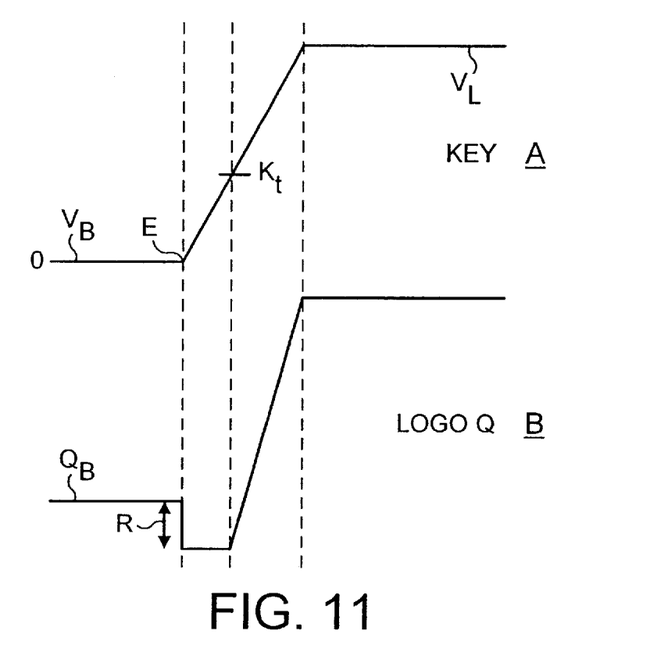
FIG. 11 schematically illustrates a key signal and variation of Q in accordance with an embodiment of an aspect of the present invention.

Referring to FIG. 11, the magnitude of the key signal is shown schematically and by way of simplified example for a portion of a video line including background video $V_B$ an edge E of a logo and logo information $V_L$. It is undesirable to reduce picture quality of the background video at the edges of a logo. Thus in accordance with this aspect of the present invention, the value of Q is decreased as indicated at R, immediately adjacent the edge of the logo as indicated by the key signal, relative to the value $Q_B$, of the background video $V_B$, thus increasing picture quality at the edge. Away from the edge, the value of Q is the value determined as described above. In a preferred embodiment of the invention this is done only if $Q_B$ is less than the Q set for the logo. That is if the quality of the background is better than that of the logo.

The Q set for the logo away from the edge region may be the fixed $Q_F$ or the value $$Q_W = K_A Q_F + (1-K_A) Q_B.$$

as described above.

The region of lower Q at the edge of the logo may be determined by comparing the key signal K with a threshold value Kt. The edge region is within the logo area and is defined by $0 < K \leq Kt$. It is assumed that the edge region will include background (first) video the quality of which needs to be maintained.

E) Rate Control

The recoding preferably uses Test Model 5 (ISO-IEC/JCT1/SC29/WG11/NO44) rate control modified as follows:

On non-logo areas of an I frame, the bits generated for each MB are accumulated to form a value "Reuse_Bits". On logo areas of the I frame, this value is used in conjunction with the number of logo MB's to that point in the frame to alter the target for Rate Control in the following way:

New_Target=Reuse_Bits+(target_bit_frame*logo_MB_so_far/total_MB)

This affects the equation for Rate Control in the following way

New_virtual_buf=init_virtual_buf+picture_bit_generated−New_Target where picture_bit_generated is the number of bits generated to the current point in the frame, and comprises the bits generated by reuse, and the bits generated by Rate Control of the logo areas.

i.e. picture_bit_generated=logo_bits+Reuse_Bits

Thus New_Target cancels the effect of re-use on the target number of bits for the logo areas of the I frame, and allows Rate Control to perform as it would if the whole frame were being recoded.

Motion Vector Processing

Overview

FIGS. 12 to 16 illustrate the processes carried out at steps 220 and 270 of FIG. 9, that is to say, producing a bit map and applying borders to boundaries between regions from the two video sources and then testing preserved motion vectors to be re-used to determine whether they point to appropriate parts of the material from the same video source.

Referring to FIG. 3, when a decision to re-use encoding parameters is made, it is important to ensure that a preserved motion vector to be re-used for a macroblock of the video A region actually points to a part of the image which is still formed of video A, i.e. it has not been replaced by video B as part of the mix, wipe or insertion process. The same applies to video B.

Figure 13A:
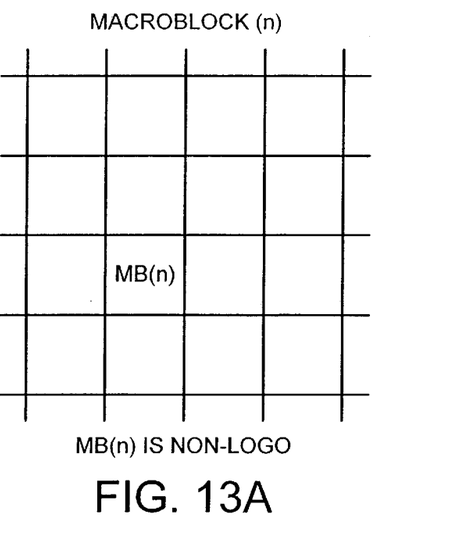
Figure 13B:
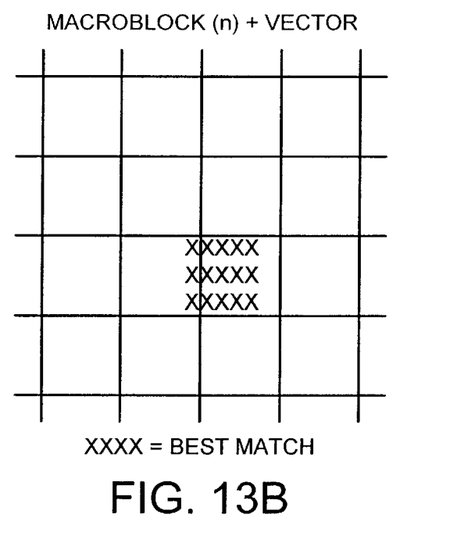
Figure 14A:
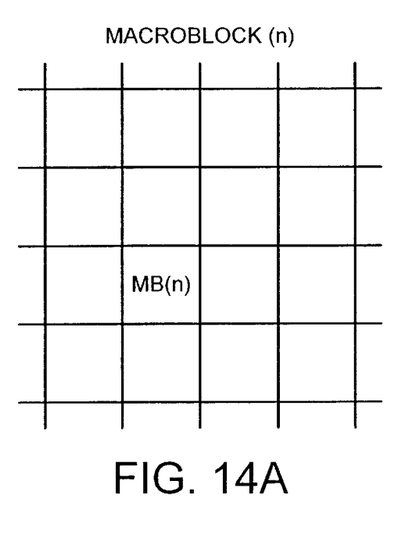
Figure 14B:
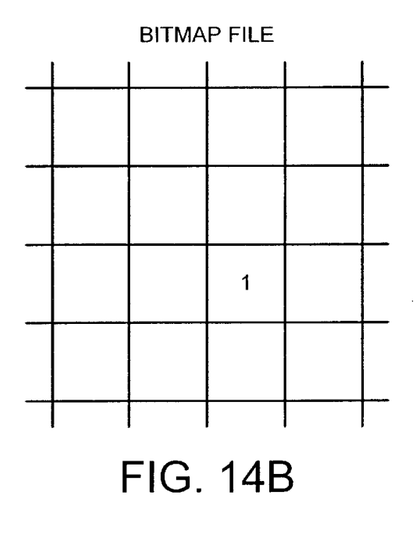
Figure 14C:
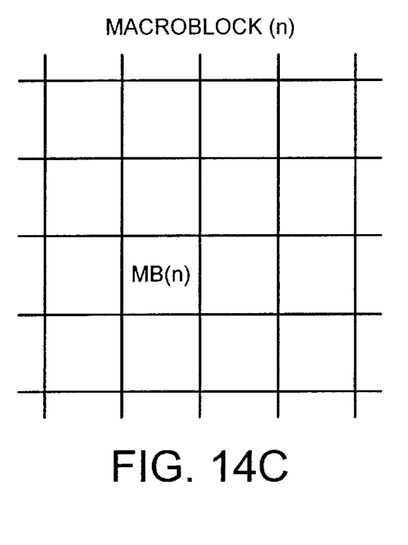
Figure 14D:
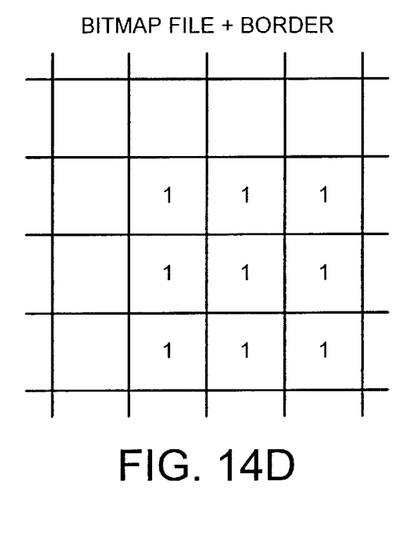
Figure 15:
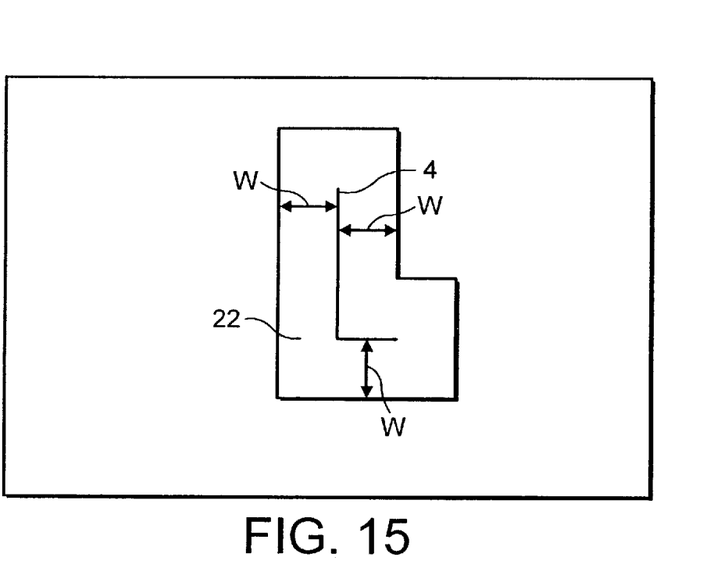
FIG. 15 illustrates another bit map.

Referring to FIGS. 14 and 15 a border (one macroblock wide in FIG. 14D) may be created around the newly inserted material. A benefit of this is that it allows the vector tests to be carried out around the newly inserted material. A benefit of this is that it allows the vector tests to be carried out at a macroblock scale rather than at a pixel scale (as in FIGS. 12 and 13) because the wide border provides an increased margin of safety to avoid errors which would otherwise be introduced by this coarser scale approach.

Thus, for example a border may be created around all macroblocks which are not entirely derived from region A and a border may be created around all macroblocks which are not entirely derived from region B.

So, if a preserved motion vector associated with a macroblock from region B points or refers to a) region A;

b) macroblocks which are not entirely from region B; or c) the border created around those macroblocks not entirely from region B;

it is not re-used but instead a new motion vector is generated in its place. Similarly, if a motion vector associated with a macroblock from region A points to:

a) region B;

b) macroblocks not entirely from region A; or c) the border created around those macroblocks not entirely from region A; again it is not re-used but instead a new motion vector is generated in its place.

EXAMPLES

Motion vectors may be processed according to any one of the illustrative techniques A, B and C described in the following. Any one of these motion vector techniques A, B and C may be used with the techniques described above for encoding solid, central and transparent macroblocks.

As discussed above the Motion Vectors $V_1$ of the original bitstream A are preserved for re-use in the encoder E2. New motion vectors $V_2$ are calculated for the combined video information including the logo information and the original video information. The sets of motion vectors $V_1$, $V_2$ are stored in files with indications indicating the macroblocks to which the motion vectors apply. In the techniques A, B and C described below, motion vectors are associated only with P and B frames. The files for B frames contain vectors for both Forward and Backward prediction.

Bit Maps

As discussed above Bit Maps are produced. Bit maps are produced for every frame showing where, in that frame, the logo information is.

A bit map is produced for an I-frame.

Each B frame uses two reference bit maps which are the bit maps of the forward frame and the backward frame to which the motion vectors of the B frame refer.

Each P frame has up to two bitmaps. One bit map is the bit map of that frame itself. The other bit map is the reference bit map i.e. the map of the frame to which the motion vectors of the P frame refer.

Technique A

The bit maps contain, for every pixel, a logic bit '1' or '0' indicating whether or not the pixel contains logo information.

'1'=logo '0'=non-logo.

Figure 12A:
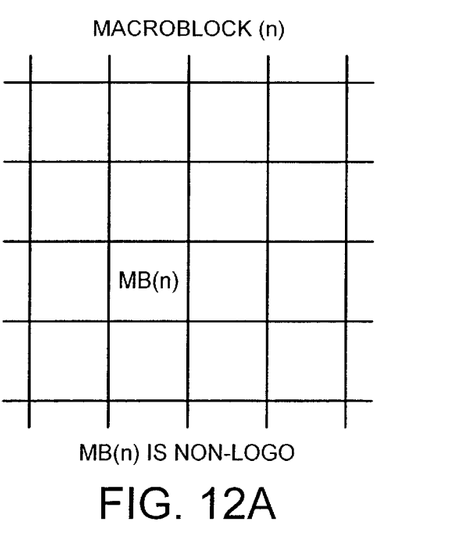
FIGS. 12 to 14 illustrate bit maps.

Referring to FIG. 12A consider a macro block MB(n) in a P or B frame of the combined video information. Assume MB(n) does not contain logo information.

The preserved motion vector of MB(n) is tested against the logo bit maps, at pixel resolution. Thus referring to FIG. 12B it is tested against a 16 pixel×16 pixel area denoted by xxxx.

Figure 12B:
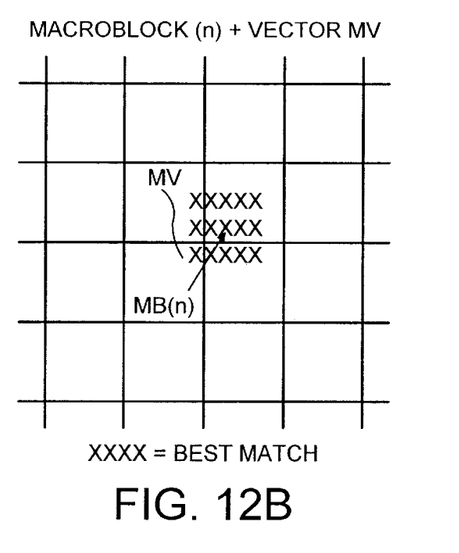

If any pixel in area xxxx equals 1, it contains logo information. Then a new vector $V_2$ is used for MB(n).

If all pixels in area xxxx equal 0 it contains non-logo information. Then a preserved vector $V_1$ is used for MB(n).

As a modification, instead of using the new vector $V_2$ if any pixel in the area xxxx contains logo information, a preserved vector $V_1$ could be used if a minority of the pixels in the area xxxx contain logo information.

Technique B

In this technique B the bit maps for the P and B frames have macroblock resolution. That is for each macroblock '1' indicates the macroblock contains logo information '0' indicates the macroblock does not contain logo information.

The preserved vectors are tested to a resolution of only one macroblock, for example to a resolution of 16 pixels, if macroblock contains 16×16 pixels.

Consider the situation of FIGS. 13A and 13B.

FIG. 13A shows a macroblock MB(n) of a P or B frame which does not contain logo information. Its motion vector points to an area xxxx of best match in another frame as shown in FIG. 13B. The area xxxx is adjacent the macroblock (n). Thus it is within 16 pixels of MB(n).

If MB(n) has a horizontal vector of value in the range 0 to 15 pixels to the right, it could incorrectly select logo pixels if pointing to a logo region.

The bit map corresponding to FIG. 13B is shown in FIG. 14B. To protect against the situation discussed with reference to FIGS. 13A and 13, in the reference frames a border of width equal to one macroblock is added around each macroblock containing logo information as shown in FIGS. 14C and 14D. The border is always one macroblock in embodiments of this second technique and is independent of vector range and of picture type.

The border is designated as containing logo information for the purposes of vector processing.

Referring to MB(n) in FIG. 14C, its motion vector is tested to a resolution of multiples of 16 pixels against macroblocks in the bit map file.

If any macroblock to which the preserved motion vector points contains logic 1 (i.e. it contains logo information or is a border), then a new vector $V_2$ is used for MB(n).

If all the macroblocks against which its preserved vector is tested contain non-logo information than the preserved vector $V_1$ is used for MB(n).

B frames use two reference bit maps as described above. A B frame may have a macroblock with motion vectors pointing to both a forward and a back-ward reference frame and thus to two reference bit maps, one motion vector in one direction may point to non-logo information and the other to logo information. An embodiment of the invention in such a situation may select the reference frame containing non-logo information and reuse the preserved vector $V_1$ for the macroblock; the other-reference frame is disregarded.

Technique C

Referring to FIG. 15, a bit map for a B or P frame is shown having logo information 4. A border 22 is provided around the logo information on the current frame being processed (not the reference frame as in techniques A and B above). The border has a width w dependent on the maximum vector range. The width w is for example 64 pixels horizontally and 32 pixels vertically.

Preferably the width w is twice the maximum vector range.

In one version of technique C, the maximum vector range is either detected from the MPEG parameters of the original video bitstream or is measured for each frame.

The border preferably has such width w that all macroblocks outside the border cannot have motion vectors referring to macroblocks within the border and containing logo information.

Thus preserved motion vectors $V_1$ are used for all macroblocks outside the border, and new motion vectors $V_2$ are calculated for all macroblocks within the border.

It will be appreciated that references to "frames" in the above description are by way of example only—in general the encoding is picture by picture, which could be frames, fields, a combination or other pictures.

The bitstream described above may comprise I, P and B frames. However it may comprise I frames together with only P frames or only B frames.

The skilled man will appreciate that the apparatus described above may be implemented at least in part by a general purpose computer running appropriate software. Such software and a storage medium by which such software is stored are both considered to be embodiments of the invention.

We claim:

1. A video signal processor comprising a first input for receiving a compressed first video signal including parameters associated with the frames of the signal and relating to the compression, a decoder for decoding the compressed first video signal to derive first video information whilst preserving the compression parameters in association with the frames, a second input for receiving additional video information to be combined with the said first video information, a combiner for combing the additional video information with the first video information to produce frames of combined information, and an encoder for encoding the frames of combined video information, reusing the said preserved parameters of each frame for encoding a part of a frame of the combined information which does not contain additional video information and for encoding an edge region of another part of the frame, which another part contains additional information, to a higher picture quality than a region of said another part which is not the edge region.

2. A processor according to claim 1, wherein the encoder encodes the said edge region with a predetermined value of a quantization parameter.

3. A processor according to claim 2, further comprising a key signal generator for producing a key signal K defining the said part of the frame containing the additional information.

4. A processor according to claim 3, wherein the edge region is defined by a value of the key signal K less than a threshold value.

5. A processor according to claim 4, the key signal K is $0<K\leq Kt$ where Kt is the said threshold value.

6. A processor according to claim 1, wherein the said regions are macroblocks.

7. A video signal processor according to claim 6, wherein the first video signal includes I frames together with P and/or B frames, wherein the encoder is arranged to encode I, P and B frames of the first video information as I, P and B frames respectively when combined with the additional video information.

8. A processor according to claim 7, wherein the encoder re-uses the said preserved parameters associated with I-frames of the first information when encoding the said part of the corresponding I-frames which does not contain additional video information.

9. A processor according to claim 8, wherein the encoder reuses the said preserved parameters associated with P-frames when encoding the said part of the corresponding P-frames which does not contain additional video information.

10. A processor according to claim 7, wherein the encoder fully recodes the P frames.

11. A processor according to claim 7, wherein the encoder fully recodes B frames.

12. A processor according to claim 1, wherein the said region of said another part which is not an edge region is encoded according to a quantization parameter determined according to a predetermined algorithm.

13. A processor according to claim 12, wherein the said quantisation parameter determined according to a predetermined algorithm has a predetermined fixed value $Q_F$.

14. A processor according to claim 12, wherein the said quantisation parameter Q determined according to a predetermined algorithm is a weighted average of a predetermined fixed value $Q_F$ and the preserved value $Q_B$ of the quantisation pamameter of the first video signal.

15. A processor according to claim 14, wherein the said quantisation parameter Q determined according to a predetermined algorithm equals $$Q=K_AQ_F+(1-K_A)Q_B$$

where $K_A$ is the average key signal value for the macroblock, $Q_F$ is a predetermined fixed value and $Q_B$ is the preserved value of the quantisation parameter of the first video signal.

16. A processor according to claim 12, wherein the encoder comprises means for determining whether all pixels of a said region contain additional information.

17. A processor according to claim 16, wherein if all the pixels of a said region contain additional information, then the quantization parameter Q has a fixed value $Q_F$.

18. A processor according to claim 12, wherein the encoder comprises means for determining whether a macroblock and all of its neighbours contain additional information.

19. A processor according to claim 18, wherein if a macroblock and all of its neighbours contain additional information, then the quantization parameter Q has a fixed value $Q_F$.

20. A processor according to claim 1, wherein the said edge region is encoded to a higher picture quality than the said region which is not an edge region only if the first signal has a higher picture quality than the said region which is not an edge region.

21. A method of processing a video signal processor comprising the steps of:
    receiving a compressed first video signal including parameters associated with the frames of the signal and relating to the compression,
    decoding the compressed first video signal to derive first video information whilst preserving the compression parameters in association with the frames,
    receiving additional video information to be combined with the said first video information,
    combining the additional video information with the first video information to produce frames of combined information, encoding the frames of combined video information, reusing the said preserved parameters of each frame for encoding a part of a frame of the combined information which does not contain additional video information and for encoding an edge region of another part of the frame, which another part contains additional information, to a higher picture quality than a region of said another part which is not the edge region.

22. A computer program product providing computer executable instructions, which when loaded on to a programmable signal processor causes the processor to implement the method of claim 21.

23. A computer program product providing computer executable instructions, which when loaded on to a programmable signal processor causes the processor to operate as the processor of claim 1.

* * * * *